(12) United States Patent
Myers et al.

(10) Patent No.: US 11,907,790 B2
(45) Date of Patent: Feb. 20, 2024

(54) COMPONENT IDENTIFICATION

(71) Applicant: Hutchinson Technology Incorporated, Hutchinson, MN (US)

(72) Inventors: Dean E. Myers, Stewart, MN (US); Michael W. Davis, Rockford, MN (US); Clark T. Olsen, Dassel, MN (US); Beauregard J. Gagnon, Buffalo, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 217 days.

(21) Appl. No.: 17/028,073

(22) Filed: Sep. 22, 2020

(65) Prior Publication Data
US 2021/0279545 A1 Sep. 9, 2021

Related U.S. Application Data

(60) Provisional application No. 62/986,582, filed on Mar. 6, 2020.

(51) Int. Cl.
*G06K 19/077* (2006.01)
*G06K 19/07* (2006.01)

(52) U.S. Cl.
CPC ... *G06K 19/07766* (2013.01); *G06K 19/0723* (2013.01); *G06K 19/07722* (2013.01); *G06K 19/07781* (2013.01); *G06K 19/07783* (2013.01)

(58) Field of Classification Search
CPC ......... G06K 19/07766; G06K 19/0723; G06K 19/07722; G06K 19/07781; G06K 19/07783

USPC ....................................................... 340/572.1
See application file for complete search history.

(56) References Cited

U.S. PATENT DOCUMENTS

| 10,140,569 B2* | 11/2018 | Kim ................. G06K 19/07722 |
| 2001/0040507 A1* | 11/2001 | Eckstein ............ G08B 13/2482 340/572.1 |
| 2012/0091821 A1* | 4/2012 | Kato ........................ H01Q 7/04 307/104 |
| 2013/0069750 A1* | 3/2013 | Singh ................... H04B 5/0075 174/262 |
| 2013/0207863 A1* | 8/2013 | Joshi ...................... A61N 1/375 343/789 |
| 2014/0339308 A1* | 11/2014 | Endou .............. G06K 19/07745 235/492 |

(Continued)

OTHER PUBLICATIONS

International Search Report and Written Opinion in International Application No. PCT/US2021/020923, dated Jul. 15, 2021.

(Continued)

*Primary Examiner* — Michael G Lee
*Assistant Examiner* — David Tardif
(74) *Attorney, Agent, or Firm* — DLA Piper LLP (US)

(57) ABSTRACT

An identification device includes a first metal layer patterned into a planar coil winding and a second metal layer electrically connected to the first metal layer. The first metal layer is operable to provide a circuit inductance. The second metal layer is patterned to provide one or more overlapping areas with the first metal layer. The second metal layer is operable to provide a circuit capacitance. The identification device includes a dielectric layer separating the first metal layer and the second metal layer.

21 Claims, 10 Drawing Sheets

(56) References Cited

U.S. PATENT DOCUMENTS

2016/0037632 A1\* 2/2016 Murakawa ............. H05K 1/092
　　　　　　　　　　　　　　　　　　　　　　428/458
2021/0158121 A1\* 5/2021 McBride .............. G06K 19/077

OTHER PUBLICATIONS

International Preliminary Report on Patentability in International Application No. PCT/US2021/020923, dated Sep. 15, 2022.

\* cited by examiner

FWHM = full width half maximum

COMPONENT IDENTIFICATION

CROSS-REFERENCE TO RELATED APPLICATIONS

This application claims priority from U.S. Provisional Patent Application No. 62/986,582, filed on Mar. 6, 2020, which is hereby incorporated by reference in its entirety.

FIELD OF THE INVENTION

The invention relates generally to embodiments of a system for identification and information transfer.

BACKGROUND

Several methods currently exist for tracking and providing information about inventoried items that may be useful for tracking surgical instruments and trays. For example, in retail and manufacturing applications, inventory items typically carry printed labels providing information such as serial numbers, price, weight, manufacturing or use dates, and size. Usually, these labels are not machine readable, but rather require human interpretation. Another method for tracking and providing information about items that ameliorates some of the short comings of printed labels is bar code labeling. Bar code labels are characterized by a pattern of vertically oriented machine readable variable width bars that, when illuminated with a bar code scanner, create a reflection pattern that translates into a unique series of numbers. The series of numbers must then be correlated to product descriptions in a relational database in communication with the bar code scanner for purposes of identification, price checking, and inventory management.

Bar code labels have received widespread use from product tracking in the package delivery business, to physical inventory tracking and even point-of-sale terminals. In some respects, due to their machine-readable nature, bar code labels represent a significant improvement over printed labels. Also, they are relatively cheap and easy to generate with a printer. There are some restrictions to bar codes, however, that limit their application to surgical instruments and trays. Bar codes are limited in size by resolution limitations of bar code scanners, and the amount of information that the symbols can contain is limited by the physical space constraints of the label. Therefore, some objects may be unable to accommodate bar code labels because of their size and physical configuration.

Another limitation of bar code readers is that they require line of sight in order to read the reflection pattern from a bar code. As labels become worn or damaged, and they can no longer be read with the bar code scanner. This is particularly likely in the some fields, for example for surgical instruments, because of the harsh conditions the labels must undergo during sterilization. Also, because a person operating the bar code scanner must physically orient either the scanner or the product to achieve line of sight on each item being scanned, items must be scanned one at a time resulting in prolonged scan time. In addition, because bar code scanning requires the operator to handle each instrument in order to scan it, a potential safety problem is created.

Data carriers such as memory devices provide an alternative method for tracking and providing information about items. Memory devices permit linking of large amounts of data with an object or item. Memory devices typically include a memory and logic in the form of an integrated circuit ("IC") and a mechanism for transmitting data to and/or from the product or item attached to the memory device. A promising memory device-based product identification technology that ameliorates many of the above noted deficiencies of both printed labels and bar coded labels is that of radio frequency identification (RFID). RFID systems use an RF field generator and a plurality of RFID tags attached to goods and products to store and retrieve information about the goods and products. RFID tags are miniature electronic circuits that store identification information, usually in the form of a number, about the products they are attached to. An RFID transponder tag typically includes a memory for storing data, an antenna, an RF transmitter, and/or an RF receiver to transmit data, and logic for controlling the various components of the memory device.

RFID tags are typically formed on a substrate and can include, for example, analog RF circuits and digital logic and memory circuits. RFID tags also can include a number of discrete components, such as capacitors, transistors, and diodes. The RF transmission of data can be accomplished with modulated back scatter as well as modulation of an active RF transmitter. RFID tags typically come in one of two types: active or passive. Active tags are characterized in that they have their own power source, such as a battery. When they enter an RF field they are turned on and then emit a signal containing their stored information. Passive tags do not contain a discrete power source. Rather, they become inductively charged when they enter an RF field. Once the RF field has activated the passive circuit, the tags emit a signal containing their stored information. Passive RFID tags usually include an analog circuit that detects and decodes the interrogating RF signal and that provides power from the RF field to a digital circuit in the tag. The digital circuit generally executes all of the data functions of the RFFD tag, such as retrieving stored data from memory and causing the analog circuit to modulate to the RF signal to transmit the retrieved data. In addition to retrieving and transmitting data previously stored in the memory, both passive and active dynamic RFID tags can permit new or additional information to be stored in the RFID tag's memory or can permit the RFID tag to manipulate data or perform some additional functions.

RFID tags are generally large in area and/or thickness. Larger tag coil diameters are needed to maximize working distance from a transmitting antenna. The large working distance, inches or more, is desired when tag orientation and location relative to the transmitting antenna lack precise positioning often from human interactions with the tag and/or antenna reader system. Commonly used RF carrier frequencies require significant inductance and capacitance circuit values to achieve resonance. The higher circuit inductance, being achieved with increasing coil turns and/or diameter generally results in a larger coil area. Higher circuit capacitance results in a thicker tag since surface mounted IC chips and/or capacitors require capacitance generally exceeding tens of picoFarads.

SUMMARY

An identification device includes a first metal layer patterned into a planar coil winding and a second metal layer electrically connected to the first metal layer. The first metal layer is operable to provide a circuit inductance. The second metal layer is patterned to provide one or more overlapping areas with the first metal layer. The second metal layer is operable to provide a circuit capacitance. The identification device includes a dielectric layer separating the first metal layer and the second metal layer.

In some embodiments, the second metal layer is electrically connected to the first metal layer with one or more vias that electrically bias the one or more overlapping areas to the first metal layer coil. The circuit capacitance of the second metal layer is adjustable by adjusting the one or more overlapping areas and the presence and location of the one or more vias that electrically connect the first and second metal layers. The one or more overlapping areas of the second metal layer and overlapping areas of the first metal layer are electrically biased at different charge (voltage) levels within an alternating current (AC) electric field.

In some embodiments, the identification device is a laminate structure operable to absorb power that is maximized at the laminate structure's natural resonance frequency when inductively coupled to an AC magnetic field. The laminate structure's natural resonance frequency can be adjustable to a specific target frequency and/or frequency spectrum that uniquely identify an attached component. The laminate structure's natural resonance frequency can be characterized with a frequency sweep of a measured impedance, the measured impedance is either reflected by or transmitted to an inductively coupled detector coil placed near the laminate structure.

In some embodiments, the circuit inductance of the first metal layer is adjustable by adjusting at least one of a coil diameter, number of coil turns and width of a coil trace. A resonance frequency full width half maximum (FWHM), sharpness, and quality factor of the first metal layer is adjustable by adjusting a height of the coil trace.

In some embodiments, the second metal layer includes more than one segmented area, each having different charge or voltage. The circuit capacitance of the second metal layer is adjustable by adjusting an edge/length between the more than one segmented area. In some embodiments, the circuit capacitance of the second metal layer is adjustable by adjusting at least one of a thickness of the dielectric layer, and a composition of the dielectric layer.

In some embodiments, the dielectric layer includes polyimide and has a thickness between 0.007-0.015 mm thickness. The first metal layer can include copper and has a thickness between 0.005-0.018 mm thickness. The second metal layer can include Stainless Steel or Copper Alloy and has a thickness, for some embodiments, between, for example, 0.018 mm-0.055 mm. In some embodiments, the second metal layer is bridged or shunted with a material with a dielectric constant much greater than air or polyimide.

An instrument that includes an identification device is also provided. the instrument includes a first metal layer patterned into a planar coil winding and a second metal layer electrically connected to the first metal layer. The first metal layer is operable to provide a circuit inductance. The second metal layer is patterned to provide one or more overlapping areas with the first metal layer. The second metal layer is operable to provide a circuit capacitance. The identification device includes a dielectric layer separating the first metal layer and the second metal layer.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

DETAILED DESCRIPTION

Product assemblies, such as miniature surgical tools, diagnostic sensors or consumer electronics, often have inserted components and/or consumables. To ensure that the product operates as intended, there is a need to for foolproof verification that an inserted component is correctly designed and/or positioned. This verification or authentication step could occur during product assembly manufacturing and/or during the intended use environment. The size and location of the inserted components and surrounding space can limit the use of typical and commercially available RFID solutions for tracking and identifying the inserted component's design and position. The proposed embodiments herein addresses the industry shortcomings.

Figure 1:
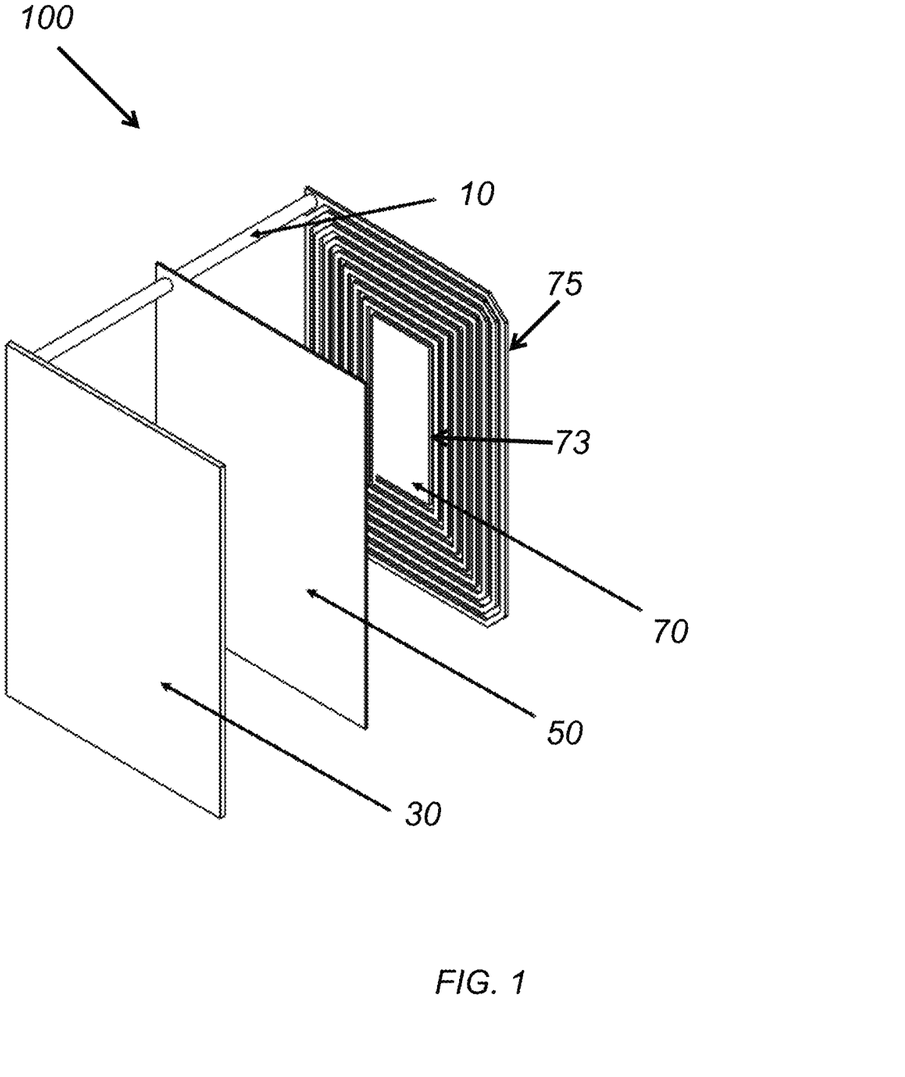
FIG. 1 illustrates an identification device, according to an example of this disclosure.

FIG. 1 illustrates an identification device 100, according to an example of this disclosure. The identification device 100 includes a first metal layer 70 patterned to form a coil, with an outer winding 75 and an inner winding 73. The identification device 100 also includes a second metal layer 30 that is patterned to provide an overlapping area with the first metal layer 70. The first metal layer 70 and/or the second metal layer 30 could be metal or semi-conductive materials that are sputtered, coated, and/or vapor deposited. For some embodiments, the metal or semi-conductive materials are formed to have a thickness less than 0.050 millimeters (mm) thickness. For other embodiments, the metal or semi-conductive materials are formed to have a thickness less than 0.012 mm. The semi-conductive materials could include polySilicon, gallium arsenide or a carbon loaded organic coating. The second metal layer 30 could have a very high magnetic permeability, such as a Nickel alloy or Mu-metal®, to focus a coupled magnetic field into the first metal layer's 70 coil.

The identification device 100 is illustrated in an exploded view. It should be understood that the components are illustrated herein for simplicity purposes; while not illustrated, the first and second metal layers may be coated in dielectric or insulating coatings or coverings.

The first metal layer 70 and the second metal layer 30 can be separated by an insulating dielectric layer 50. One via 10 connects the outer winding 75 of the coil through the insulating dielectric layer 50 to the overlapping second metal layer 30. The via 10 is configured to electrically (voltage) bias one or more of the second metal layer 30 overlapping areas to one or more of the first metal layer 70 coil traces (windings).

The first metal layer 70, including a coil winding, is configured to have an inductance. The second metal layer 30 is configured to a capacitance to the circuit based on the overlapping first and second metal layer areas that are electrically biased at different charge (voltage) levels within an alternating current (AC) electric field. For some embodiments, the identification device 100 may be configured as a laminate structure. The laminate structure can be operable as an inductance-capacitance (LC) tank circuit that when inductively coupled to an AC magnetic field absorbs power that is maximized at the laminate structure's natural resonance frequency (f res).

The identification device's inductance and capacitance are specifically adjusted to obtain the targeted resonant frequency. Structure inductance is typically adjusted with coil diameter, number of coil turns and width of coil traces. The height of the coil trace can be used to adjust circuit resistance which will change the resonance frequency full width half maximum (FWHM) peak width (sharpness) or quality (Q) factor. The identification device's capacitance is typically adjusted with overlapping area between the first 70 and second 30 metal layers and the presence and location of one or more vias that electrically connect the first 70 and second 30 metal layers. Furthermore, changing the dielectric layer 50 thickness and material or using a dielectric layer having a different dielectric constant would affect the device's capacitance. The spacing and dielectric material between the coil's windings (traces) and additional dielectric coverings or coatings over the first and/or second metal layers also change circuit capacitance.

For some embodiments, the identification device 100 is configured to have an area less than 4 mm×4 mm and less than 0.1 mm thick. The first layer 70, including a coil, can be made up of copper and is formed to be between 0.005-0.018 mm thick (e.g., about 0.012 mm thick). The second metal layer 30 can be made up of Stainless Steel or Copper Alloy and is formed, according to some embodiments, to be between 0.018-0.055 mm thick (e.g., about 0.050 mm thick). The dielectric layer can be made up of polyimide and is formed to be between 0.007-0.015 mm thick (e.g., about 0.010 mm thick).

The identification device 100 could include more than one coil. For example, first metal layer 70 may include more than one coil. Some embodiments include multiple coils on more than one layer. Some embodiments include multiple capacitive layer circuits on the same layer or on different layers. For some embodiments, using multiple coil and capacitive layer circuits enables the use of multiple resonant targets or frequency patterns in a single identification device.

Figure 2:
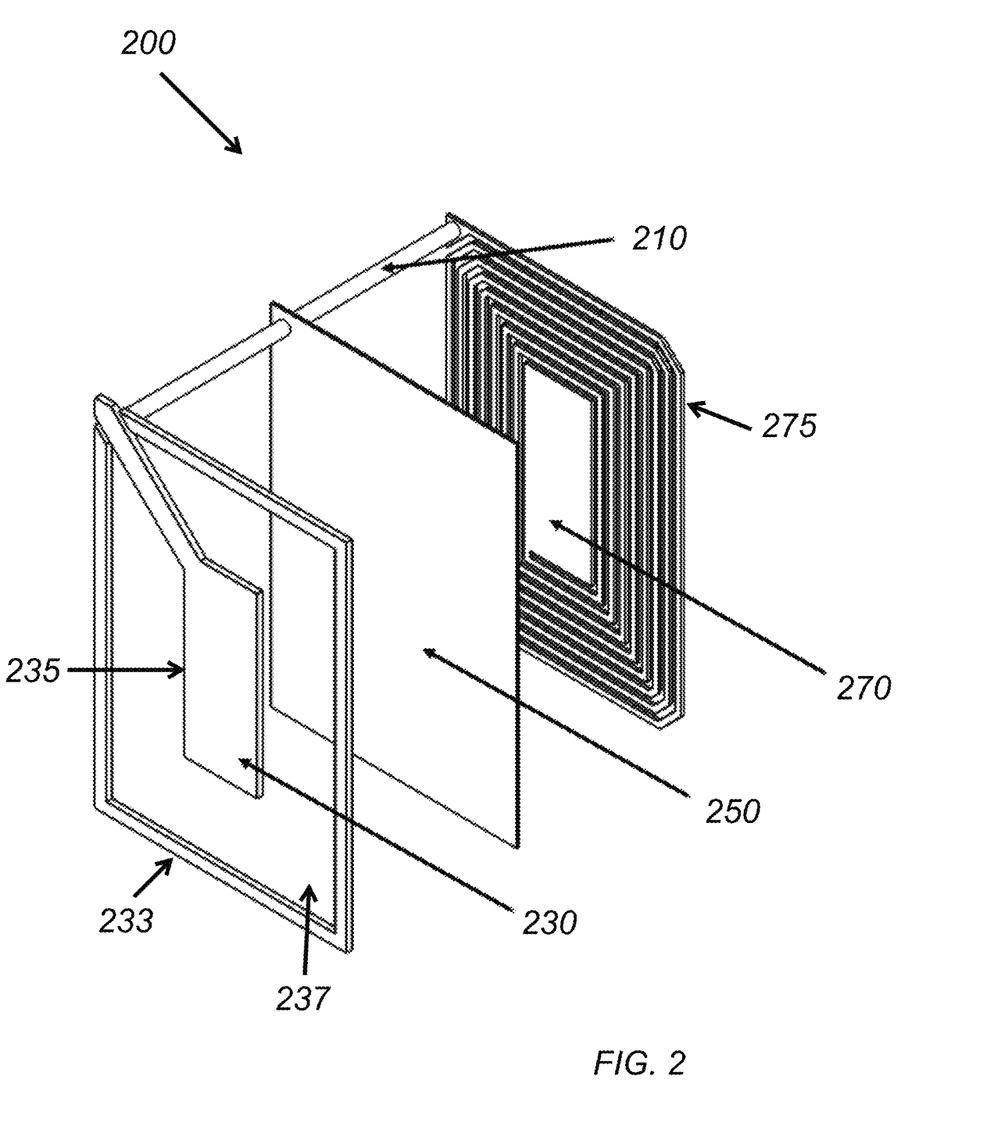
FIG. 2 illustrates an identification device, according to an example of this disclosure.

FIG. 2 illustrates an identification device 200, according to an example of this disclosure. The identification device 200 includes a first metal layer 270 patterned to form a coil and a second metal layer 230 that is patterned. The second metal layer 230 includes an outer layer 233 and a central overlapping area 235, separated from the outer layer 233 by an aperture 237. One via 210 connects the outer winding of 275 the coil through the insulating dielectric 250 to the overlapping second metal layer 230. The overlapping area between the first and second metal layers is reduced by the area of the aperture 237. Similar to above, such an embodiment, can be configured to include any number of coils and any number of capacitive layer circuits.

Figure 3:
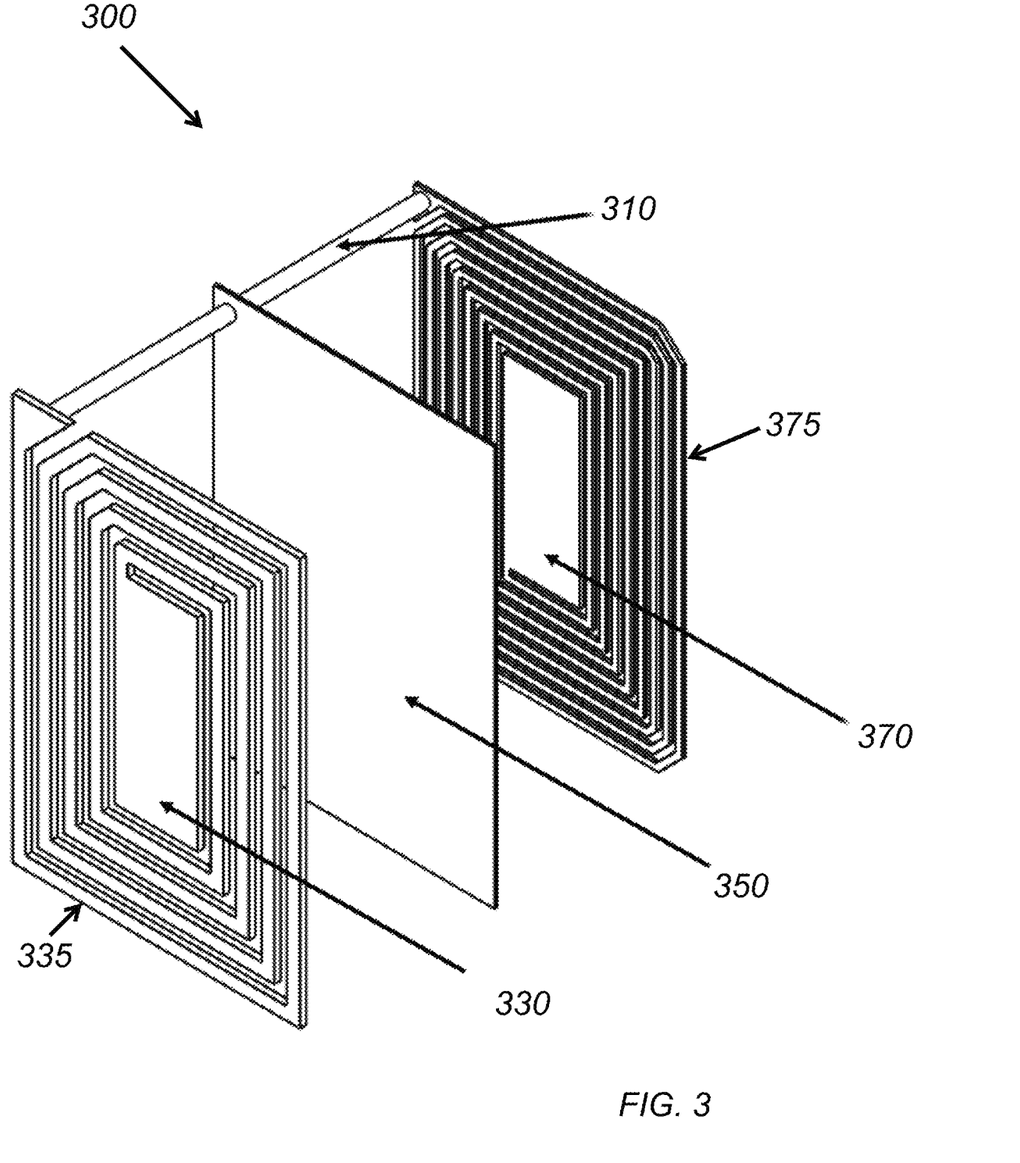
FIG. 3 illustrates an identification device, according to an example of this disclosure.

FIG. 3 illustrates an identification device 300, according to an example of this disclosure. The identification device 300 includes a first metal layer 370 patterned to form a coil and a second metal layer 330 that also is patterned to form a coil. One via 310 connects the outer winding 375 of the first coil through the insulating dielectric 350 to the outer winding 335 of the coil on the second metal layer. The overlapping area between the first and second metal layers is reduced. Overall circuit inductance is increased since both metal coil layers are inductors in series. If the via 310 is omitted then the first and second metal layers, although exhibiting a common (mutual) capacitance, would have two separated resonant frequencies.

The center of first metal layer 370 is at the highest positive potential, providing a resistance effect and voltage drop as the voltage travels down the coil. In contrast, at the center of and the second metal layer 330 is at the lowest potential, providing a high capacitance coupling between the two coils. The identification device 300 provides two inductors in series which almost doubles the inductance to significantly affect the resonance frequency by a factor of square root of two ($\sqrt{2}$), and ultimately providing the capacitance as needed to get the resident signature. Similar to above, such an embodiment, can be configured to include any number of coils and any number of capacitive layer circuits.

Figure 4:
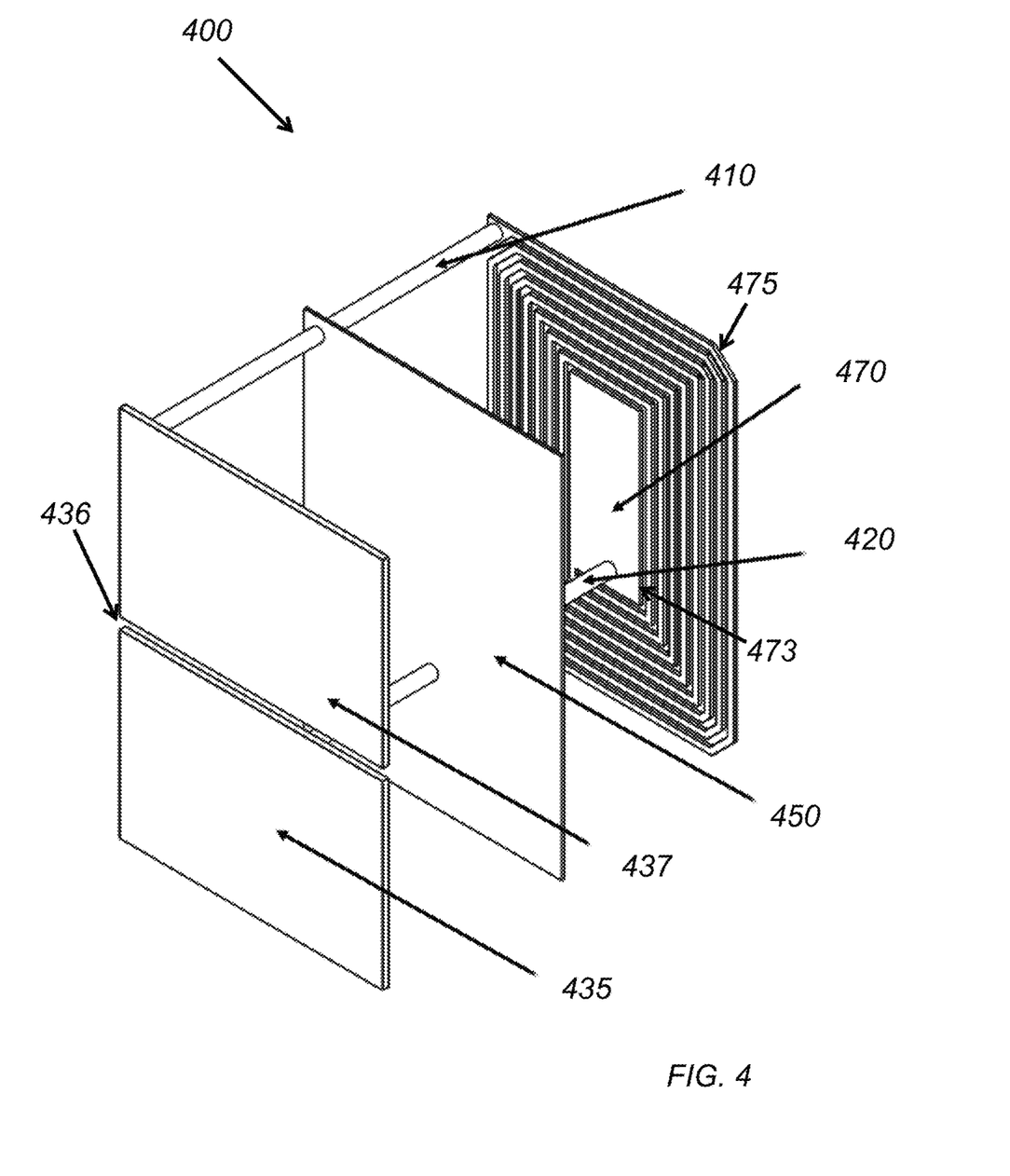
FIG. 4 illustrates an identification device, according to an example of this disclosure.

FIG. 4 illustrates an identification device 400, according to an example of this disclosure. The identification device 400 includes a first metal layer 470 patterned to form a coil and a second metal layer that also is patterned to form two separate plate areas 435 and 437. One via 410 connects the outer winding 475 of the first coil through the insulating dielectric 450 to the first plate area 437. A second via 420 connects the inner winding 473 of the first coil through the insulating dielectric 450 to the second plate area 435. A voltage or charge difference exists between the two plate areas 435, 437 of the second metal layer. Essentially, the first plate area 437 is bias to the outer winding 475 of the first coil and the second plate area 435 is bias electrically to the inner winding 473 of the first coil to provide the greatest potential difference between the two capacitor plate areas 435, 437. This configuration provides a capacitor effect of each plate area relative to the first metal layer 470 patterned to form a coil. The dielectric gap 436 between the two plate area edges provides additional capacitance to the alternative identification device 400. Since the second metal layer is segmented into two different areas having different charge or voltage, then the sidewall gap distance and corresponding length between the two segmented areas can significantly adjust the device's capacitance.

In some embodiments, the two plate areas 435, 437 of the second metal layer can be bridged or shunted with additional materials having a dielectric constant (k) much greater than air (k=1) or polyimide insulator coating (k=3). An example material having high dielectric constant is titanium oxide (k≥80). Additionally, surface mount capacitors of several picoFarads or more could be glued or soldered across the two plate areas 435, 437. Similar to above, such an embodiment, can be configured to include any number of coils and any number of capacitive layer circuits.

Figure 5:
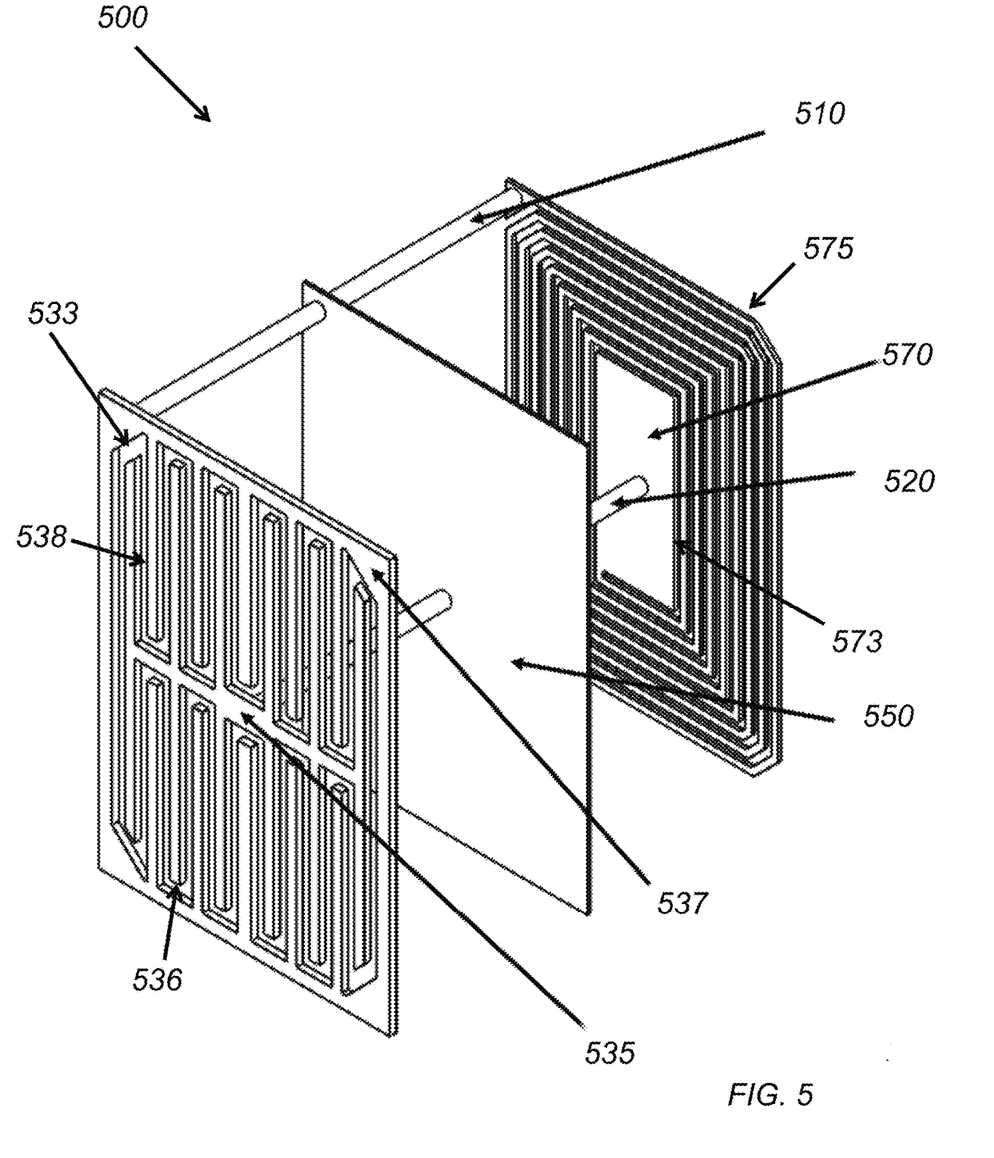
FIG. 5 illustrates an identification device, according to an example of this disclosure.

FIG. 5 illustrates an identification device 500, according to an example of this disclosure. The identification device 500 includes a first metal layer 570 patterned to form a coil and a second metal layer that also is patterned to form two separate plate areas 535, 537. The first plate area 537 includes an outer layer with extending elements 538 extended towards the second plate area 535. The second plate area 535 includes an inner layer and protruding elements 536 extended towards the first plate area 537 and alternating between the extending elements 538. One via 510 connects the outer winding 575 of the first coil through the insulating dielectric 550 to the first plate area 537. A second via 520 connects the inner winding 573 of the first coil through the insulating dielectric 550 to the second plate area 535. A voltage or charge difference exists between the two plate areas 537, 535 of the second metal layer. The dielectric gap 533 between the two plate area edges provides additional capacitance to the identification device 500.

FIG. 5 is similar to FIG. 4; however, FIG. 5 maximizes the length of the gap that's assigned to the edge of the first plate area 537 and the second plate area 535, that are separated at different potentials. Specifically, the two plate areas have been interdigitated, or meandered such that the length of the gap 533 that separates the first plate area 537 and the second plate area 535 is maximized. In some embodiments, the dielectric gap 533 may be less than 100 microns (µm). The protruding elements 536 and extending elements 538 can be meandered such that the two plate areas are indigitated. The protruding elements 536 are at one potential and the extending elements 538 are at a different potential. The sidewall gap 533 is defined as the capacitance between two plate areas.

The length of the dielectric gap 533 and thus capacitance has been significantly increased through inter-digitation and meandering the plate areas 537, 535 having the maximal charge (voltage) difference. Additionally, the dielectric gap 533 distance can be narrowed to 0.005 mm or less using additive plating processes including those known in the art to fill in the dielectric gap space and significantly increase circuit capacitance. The inner 573 and outer coil 575 windings produce the maximum voltage difference in the AC inductive field. Locating one or more vias away from the outer and inner windings would reduce the induced voltage difference and provide another means to change the capacitance of the identification device 500. Similar to above, such an embodiment, can be configured to include any number of coils and any number of capacitive layer circuits.

Figure 6:
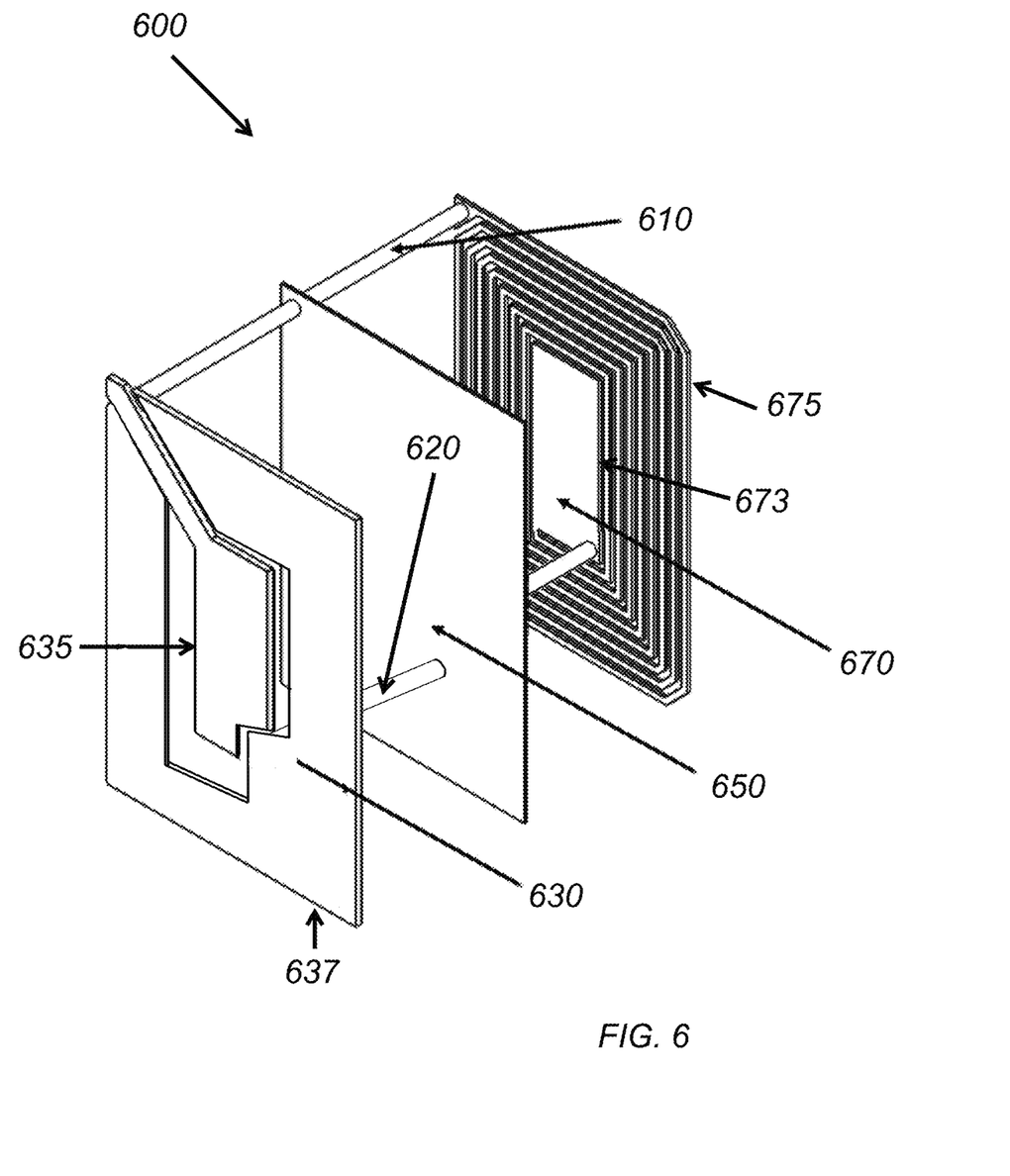
FIG. 6 illustrates an identification device, according to an example of this disclosure.

FIG. 6 illustrates an alternative identification device 600, according to an example of this disclosure. The identification device 600 includes a first metal layer 670 patterned to form a coil and a second metal layer 630 that also is patterned to form two separate plate areas 637, 635. One via 610 connects the outer winding of the first coil through the insulating dielectric 650 to the first plate area 635. A second via 620 connects the inner winding 673 of the first coil through the insulating dielectric 650 to the second plate area 637. A voltage or charge difference exists between the two plate areas 635, 637 of the second metal layer. Additionally, the voltage or charge difference between the first 670 and second 630 overlapping metal layers is maximized such that the outer first layer 675 coil winding has a via 610 connection to the plate area that mostly overlaps the inner windings of the coil. Conversely, the via 620 connects the inner windings 673 to the plate area that mostly overlaps the outer coil 675 windings. This embodiment strives to maximize circuit capacitance by meandering the side wall gap between the two plate areas of the second metal layer 630 and by providing overlapping metal areas between the first 670 and second 630 metal layers having maximal voltage or charge difference. Similar to above, such an embodiment, can be configured to include any number of coils and any number of capacitive layer circuits.

Figure 7:
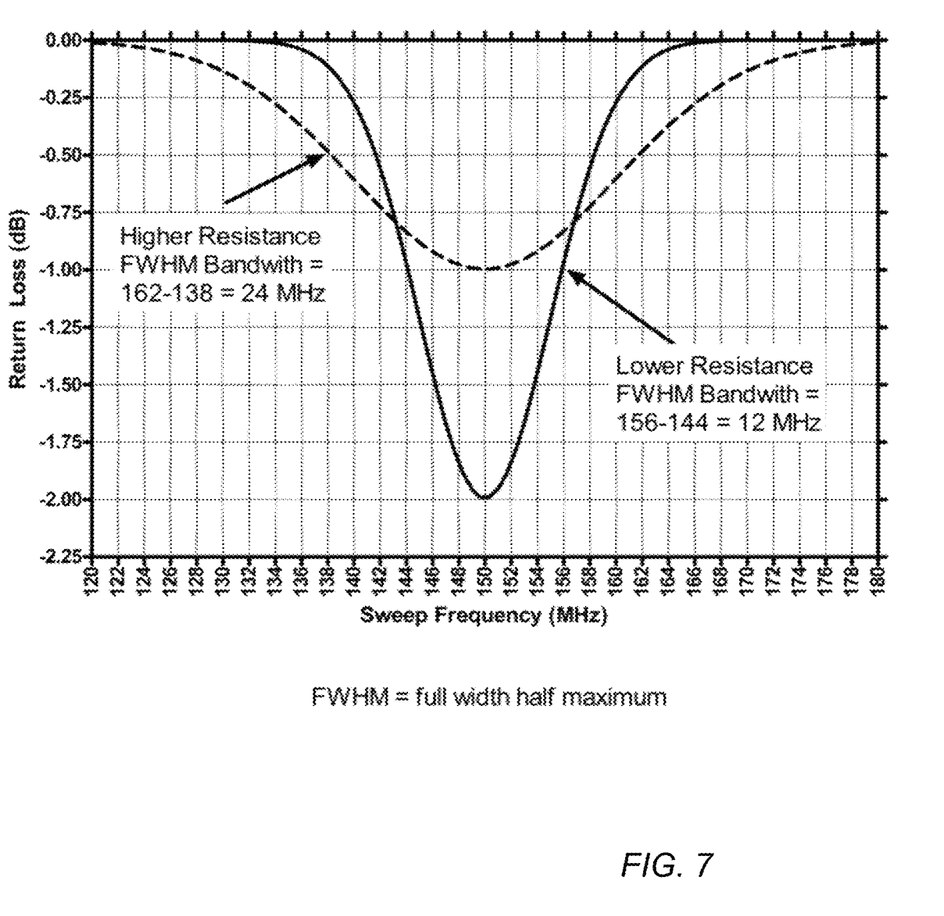
FIG. 7 illustrates an example of how circuit resistance would change resonant peak bandwidth, according to an example of this disclosure.

FIG. 7 shows an example of how circuit resistance would change resonant peak bandwidth. The resonant frequency is measured in units of reflected return loss (−db). Other frequency dependent measurement units such as transmitted return loss (+db), impedance (Ohm), inductance (Henry) or capacitance (Farad) would generate useful resonance frequency spectra with peak amplitudes that are either maximized, minimized or cross zero at the targeted resonant frequency.

Figure 8:
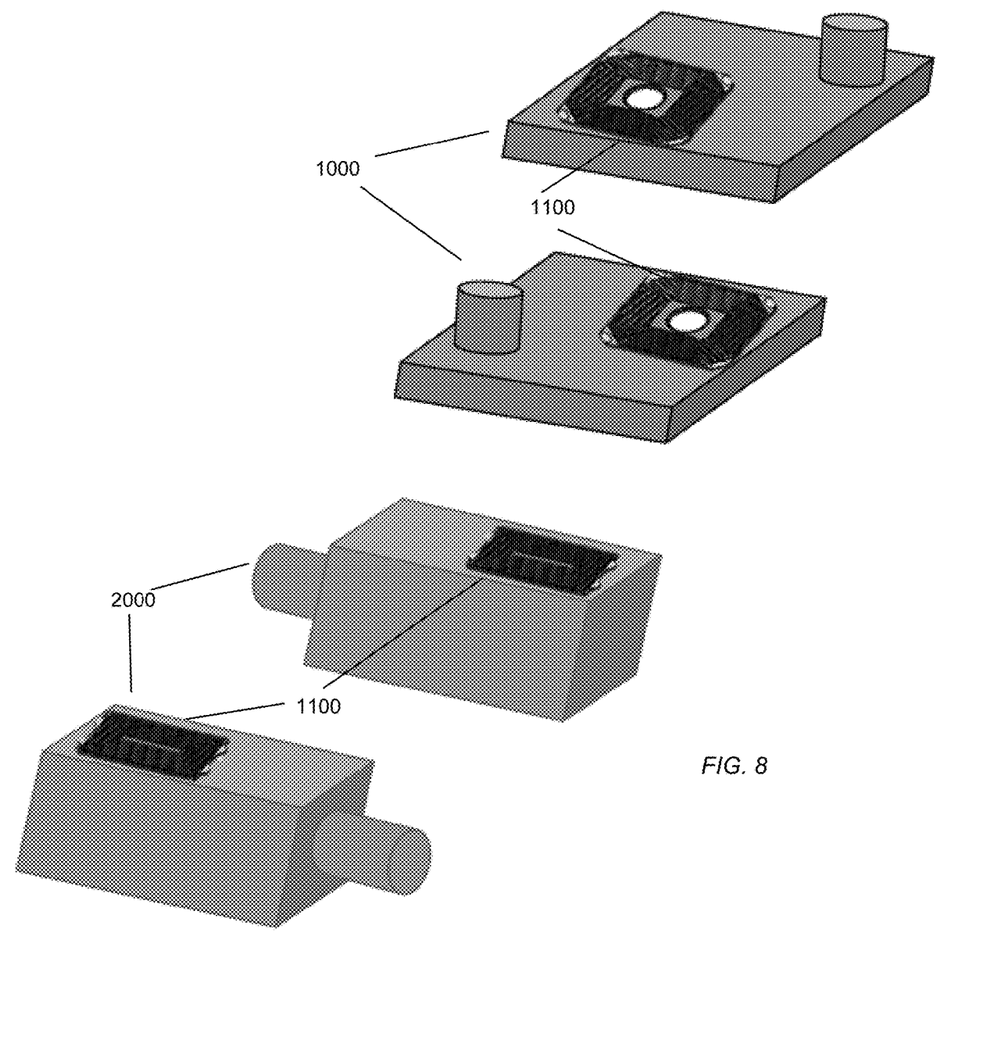
FIG. 8 illustrates exemplary components, each including an identification device, according to an example of this disclosure.

FIG. 8 illustrates exemplary components 1000, 2000, each including an identification device 100, according to an example of this disclosure. A device can be configured to receive one or more of the components. The components 1000, 2000 comprises a structure having a hollowed body. In FIG. 8, for purposes of example only, the identification device 1100 is located on a base surface of the components 1000, 2000. However, it should be noted that the identification device 1100 can be located anywhere on the device without departing from the spirit or scope of this invention. Alternatively, the component 1000, 2000 may be of a kit configuration such that a component is placed inside the a body of a device. Moreover, the device themselves may be configured with the identification device 1100, such as those described herein. In some embodiments, the component is operable to wirelessly inventory its contents by reading the contents of each identification device 1100. This is described in greater detail below with respect to FIG. 10.

The components 1000, 2000 are illustrated with two different designs and size configurations. It is understood that the components can be configured to inserted into an assembly of a device. In some instances, the incorrect component is inserted into an assembly. Moreover, the component may be orientated in the wrong direction. The identification device 1100 can be configured such that if the component is not orientated properly the identification device 1100 is off-center from the reading device. As a result, a detector coil of the reading device is configured to determine the component is incorrectly inserted. This is described in greater detail below with respect to the reading device, which according to some embodiments is a portable network analyzer of FIG. 9.

The components 1000, 2000 are configured to incorporate the identification device 1100 with the least amount of intrusion into the component material. Because the identification device can be configured to have smaller packages than those that include IC components, the component 1000, 2000 size can be minimized, which enables custom operating frequency with coils having the smaller footprint areas/ inductance. In some embodiments, multiple identification device 1100 could also be created with multiple first and second layer structures stacked upon each other such that the device's footprint area is constant as the thickness is grown. Conversely, the identification device 1100 could have individual resonators located side by side or interleaved for which case the thickness is constant and the footprint area grows. For some embodiments, one or more identification devices can be contained in the material that forms at least a portion of a component. For example, for a component that is formed used injection molding techniques, the identification device can be inserted into the mold prior to the material being inserted into the mold such that the identification device is integral with the component.

Figure 9:
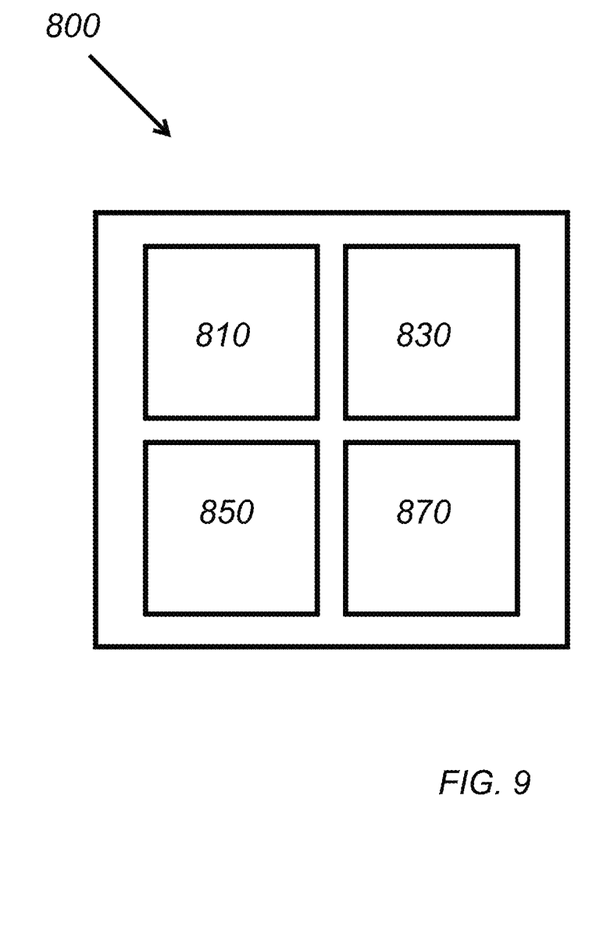
FIG. 9 illustrates a reading device configured to detect an identification device, according to an example of this disclosure.

FIG. 9 illustrates a reading device for detecting the identification device. For some embodiments a reading device is a portable network analyzer 800 configured to detect an identification device, according to an example of this disclosure. The portable network analyzer 800 includes a detector coil 810, a first detector 830, a second detector 850, and a input/output 870 to peripheral device. The portable network analyzer 800 sends out an RF signal to the detector coil 810 and either out into free space or it's going to be reflected back to the portable network analyzer 800.

Essentially, the portable network analyzer 800 serves as both a generating and detector source for the RF signal. The portable network analyzer 800 includes two detectors 830, 850. The first detector 830 detects the power going forward to the detector coil 810. The second detector 850 detects the power being reflected back from the detector coil 810. When the first metal layer 70 patterned to form a coil gets into the proximity of the detector coil 810, the second detector 850 absorbs some of that power that is no longer being reflected back to the network analyzer 800, and detects that power absorbance and that shows up in a return loss.

Figure 10:
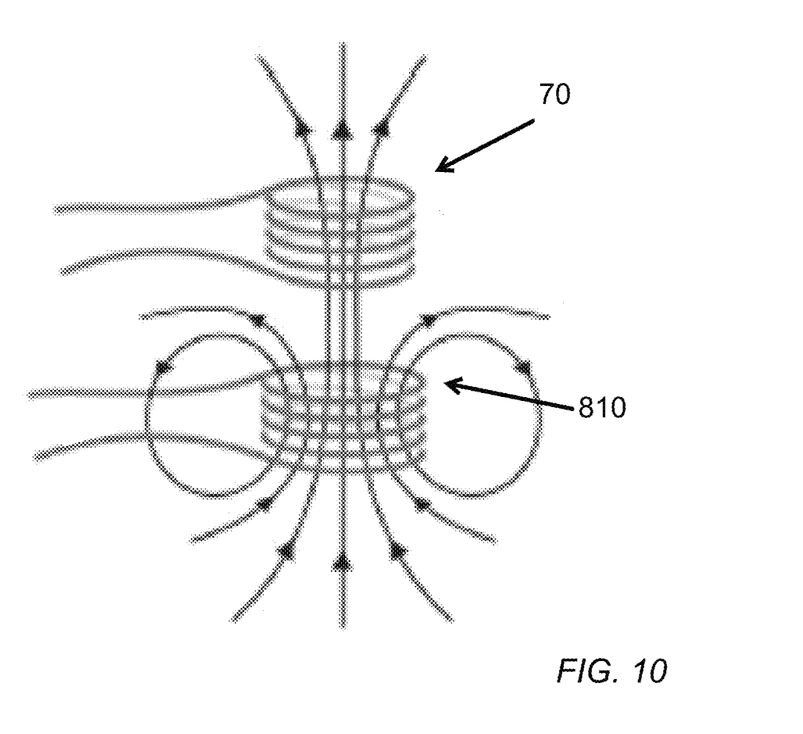
FIG. 10 illustrates an inductive coupling of the reading device and the identification device, according to an example of this disclosure.

FIG. 10 illustrates an inductive coupling of the detector coil 810 of the portable network analyzer and the first metal layer 70 patterned to form a coil of the identification device, according to an example of this disclosure. An AC current is sent through a detector coil 810 creating a magnetic field that extends through the identification device into the first metal layer 70 that is a patterned to form a coil. When the magnetic field is oscillating it creates an oscillating electric field into the first metal layer coil 70, which creates the changing voltage between the coil windings. The changing voltage provides the resident signature of the identification device. The coupling can verify several features of component, including its presence, identifying features such as make and model, and whether the component is in the correct orientation. Other features of identification can be determined or verified. The identification device's resonant frequency (f res) can be adjusted to a specific target frequency and/or frequency spectrum that uniquely identify the attached component by changing the inductance and capacitance characteristics of the identification device. For some embodiments, compared to the identification device 1100, the detector coil 810 diameter is smaller or similar size. The separation distance between the first metal layer 70 patterned to form a coil and the detector coil 810 is also smaller than the detector coil 810 diameter. The tight coupling between first metal layer 70 patterned to form a coil and the detector coil 810 causes the resonance peak amplitude, such as impedance or return loss, to be very sensitive to coil gap (Z axis) and lateral (XY axis) separation distances. Thus, at any given gap separation the detector coil 810 can detect presence and lateral orientation of the attached component. However, if orientation information about the identification device is not desired the size of the detector coil may be larger than that of the size of the one or more coils used in the identification device.

The identification device's f res is typically characterized with a frequency sweep of the structure's measured impedance ($\Omega$) or return loss (db). Return loss is either reflected by or transmitted to an inductively coupled detector coil 810 placed in close proximity to the identification device 1100.

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. An identification device comprising:
    a first metal layer patterned into a planar coil winding configured to have an inductance;
    a second metal layer electrically connected to the first metal layer, the second metal layer includes an outer layer and a central overlapping area connected to the outer layer that overlaps with the first metal layer and configured to have a capacitance, wherein an aperture is formed between the central overlapping area and the outer layer; and
    a dielectric layer separating the first metal layer and the second metal layer.

2. The identification device of claim 1, wherein the outer layer of the second metal layer is electrically connected to the first metal layer with one or more vias.

3. The identification device of claim 2, wherein the capacitance of the second metal layer is adjustable by adjusting the one or more overlapping areas and a presence and a location of the one or more vias that electrically connect the first and second metal layers.

4. The identification device of claim 1, wherein the one or more overlapping areas of the second metal layer overlap a first portion of the first metal layer.

5. The identification device of claim 1, wherein the identification device is a v configured to absorb power that is maximized at a resonance frequency ($f_{res}$) of the laminate structure when inductively coupled to an AC magnetic field.

6. The identification device of claim 5, wherein the resonant frequency of the laminate structure is set to a specific target frequency and/or frequency spectrum to uniquely identify an attached component.

7. The identification device of claim 6, wherein the resonant frequency of the laminate structure is characterized with a frequency sweep of a measured impedance, the measured impedance is either reflected by or transmitted to an inductively coupled detector coil placed near the laminate structure.

8. The identification device of claim 1, wherein the inductance of the first metal layer is configured by adjusting at least one of a coil diameter, number of coil turns and width of a coil trace.

9. The identification device of claim 8, wherein a resonance frequency full width half maximum (FWHM), sharpness, and quality factor of the first metal layer is configured by adjusting a height of the coil trace.

10. The identification device of claim 1, wherein the second metal layer includes more than one segmented areas.

11. The identification device of claim 10, wherein the more than one segmented areas are meandered.

12. The identification device of claim 1, wherein the capacitance of the second metal layer is configured by adjusting at least one of a thickness of the dielectric layer, and a composition of the dielectric layer.

13. The identification device of claim 1, wherein the dielectric layer is made of polyimide and has a thickness between 0.007-0.015 mm thickness.

14. The identification device of claim 1, wherein the first metal layer is made of copper and has a thickness between 0.005-0.018 mm thickness.

15. The identification device of claim 1, wherein the second metal layer includes Stainless Steel or Copper Alloy and has a thickness between 0.018-0.055 mm thickness.

16. A component comprising:
an identification device including:
- a first metal layer patterned into a planar coil winding configured to have an inductance;
- a second metal layer electrically connected to the first metal layer, the second metal layer is patterned to provide an outer layer and a central overlapping area that connects to the outer layer and overlaps with the first metal layer and is configured to have a capacitance, wherein an aperture is formed between the central overlapping area and the outer layer; and
- a dielectric layer separating the first metal layer and the second metal layer.

17. The component of claim 16, wherein the outer layer of the second metal layer is electrically connected to the first metal layer with one or more vias.

18. The component of claim 17, wherein the capacitance of the second metal layer is configured by adjusting the one or more overlapping areas and a presence and a location of the one or more vias that electrically connect the first and second metal layers.

19. The component of claim 16, wherein the one or more overlapping areas of the second metal layer overlap a first portion of the first metal layer.

20. The component of claim 16, wherein the dielectric layer is made of polyimide and has a thickness between 0.007-0.015 mm thickness.

21. The component of claim 16, wherein the first metal layer is made of copper and has a thickness between 0.005-0.018 mm thickness.

* * * * *